June 1, 1937.  C. B. PALUCKI  2,082,080
LAMP FINISHING MACHINE
Filed July 27, 1935  3 Sheets-Sheet 2
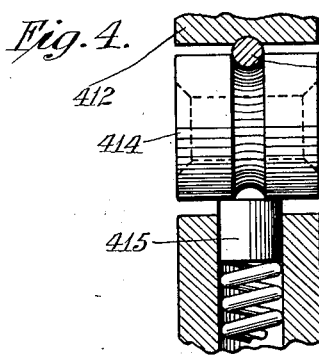
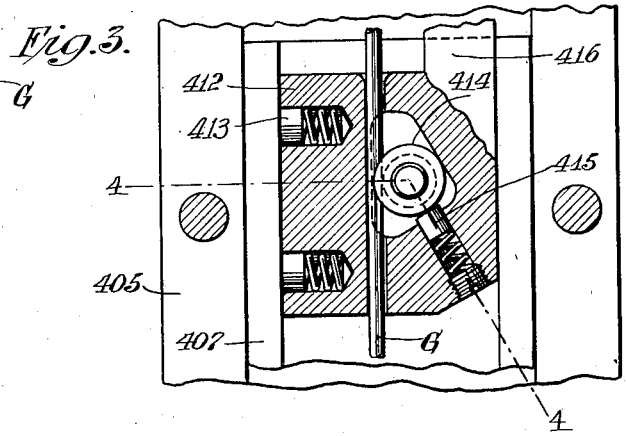
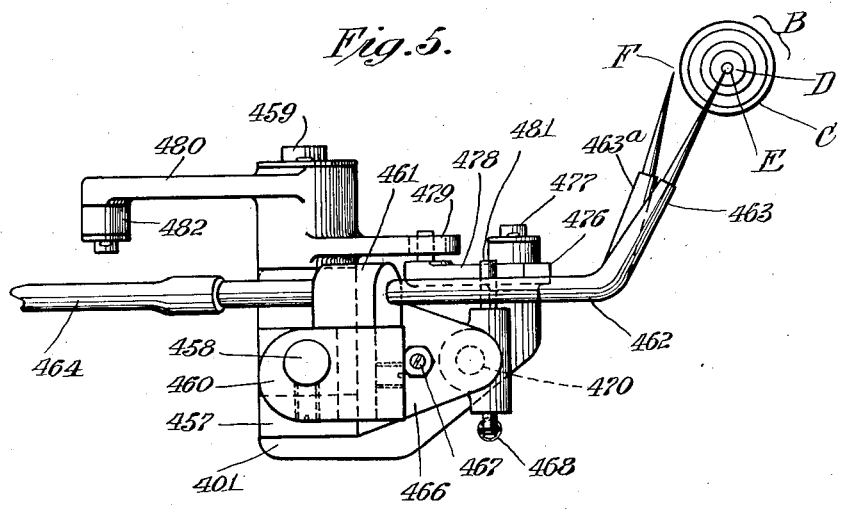
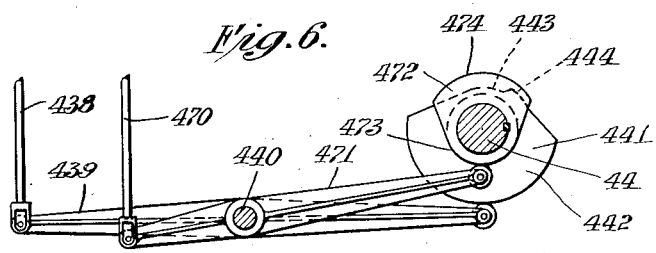
INVENTOR:
Charles B. Palucki
BY
Morrison, Kennedy & Campbell
ATTORNEYS.

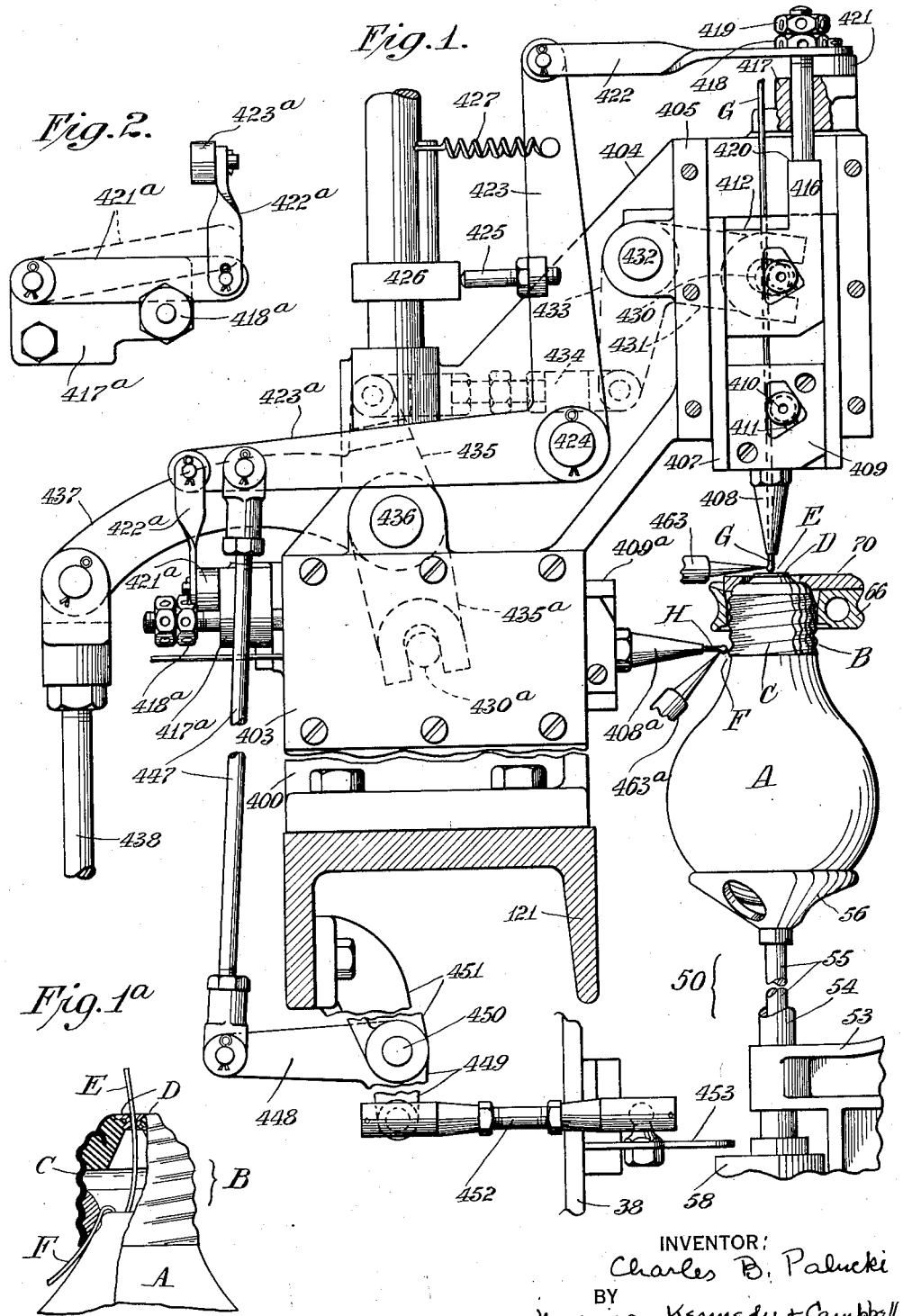

June 1, 1937.  C. B. PALUCKI  2,082,080
LAMP FINISHING MACHINE
Filed July 27, 1935  3 Sheets-Sheet 3

INVENTOR:
Charles B. Palucki
BY
Morrison, Kennedy & Campbell
ATTORNEYS.

Patented June 1, 1937

2,082,080

UNITED STATES PATENT OFFICE 2,082,080

LAMP FINISHING MACHINE

Charles B. Palucki, Bergenfield, N. J., assignor to Alfred Hofmann & Company, West New York, N. J., a corporation of New Jersey Application July 27, 1935, Serial No. 33,424

13 Claims. (Cl. 113—59)

This invention relates to lamp finishing machines, which deal with the attaching of the base or end member to the glass container or bulb of an incandescent electric lamp, and the subsequent operations thereon; the present invention being directed particularly to an improvement in the mechanism for soldering to one or both metallic portions of a lamp base the loose leadwires, to which, for example, the filament or electrode is connected.

As an example of a lamp finishing machine of the kind referred to reference is made to copending application of C. B. Palucki, Serial No. 722,627, filed April 27, 1934, patented February 2, 1937, No. 2,069,386. The present invention is illustratively shown applied to the machine disclosed in said prior application, and many features and details are omitted herefrom for brevity, as reference may be made to the prior application therefor.

The general object of the present invention is to improve the leadwire soldering operation as to efficiency and accuracy of operation and reliable uniformity of product. A particular object is to simplify leadwire soldering mechanisms, especially for operation with solder in the form of a strip or wire.

Other and further objects and advantages will be explained in the following description of an illustrative embodiment of the invention or will be understood by those conversant with the subject. To the attainment of such advantages, the present invention consists in the novel leadwire bending and severing mechanism and the novel features of combination, arrangement and construction herein illustrated or described.

Figure 1 is a right elevation of a soldering mechanism of a design adapted for use in the machine of said prior application 722,627. Fig. 1ª conventionally shows in section a lamp base form that may be soldered thereon.

Fig. 2 is a front elevation of a detail of Fig. 1, referring especially to a part of the connections for controlling the end or top solder feeding devices, looking from the left side of Fig. 1.

Fig. 3 is a right elevation and vertical section of one of the feeding grippers.

Fig. 4 is a section taken on the crooked line 4—4 of Fig. 3.

Fig. 5 is a top plan view of the solder heating device.

Fig. 6 is a right elevation of the actuating connections, namely from the cam shaft to the vertical connecting rods extending respectively to the end and side soldering mechanism as seen in Figs. 1 and 7 respectively.

A conventional lamp is indicated in Figs. 1, 1ª and 7 comprising bulb A, at the upper end of which has been united the base member B comprising the screw threaded metallic sleeve C and at the end the metallic button or disk D separated from the sleeve by insulating material. Connected with the lamp filament are the two leadwires, the end leadwire at the position E and the side leadwire at the position F, but these not appearing in Figs. 1 and 7, as they have been severed and bent snugly into position in a previous operation. By the present invention there is applied a small portion of solder G at the end, and at the side some solder H, for electrically uniting the leadwires with the end disk and sleeve respectively.

Figure 7:
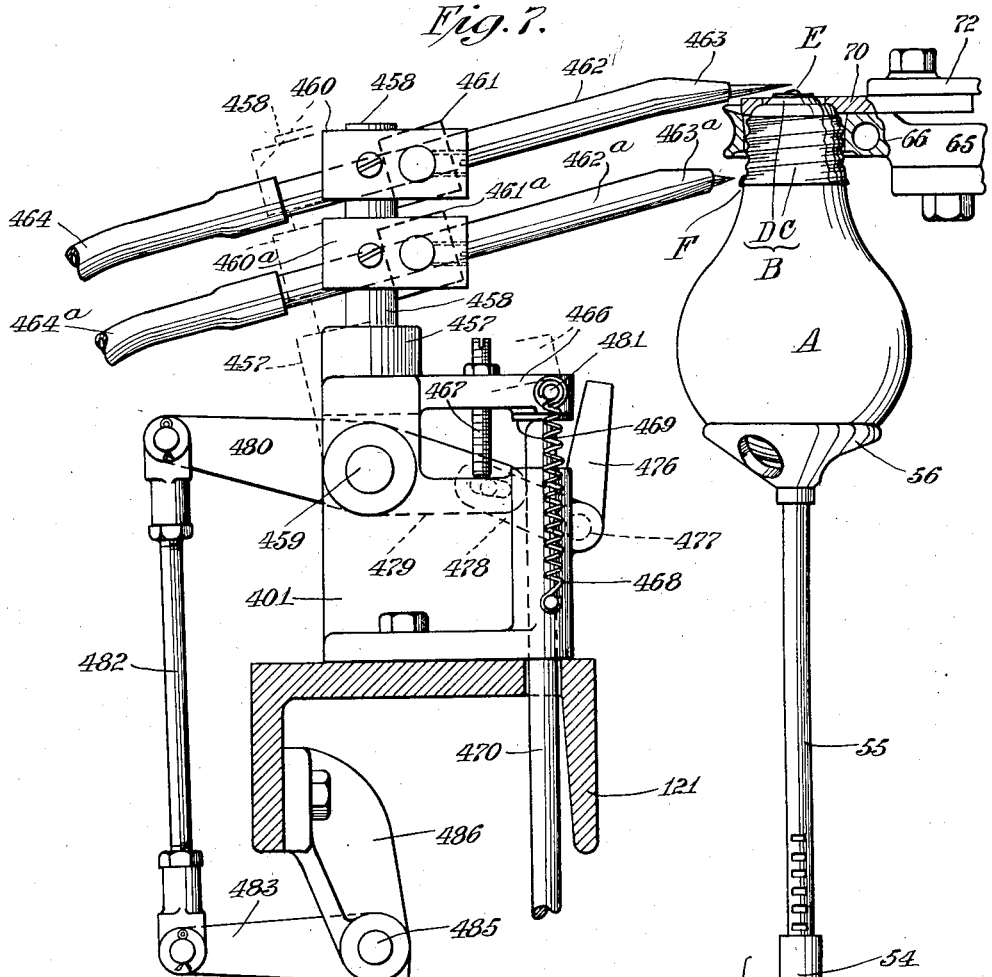
Fig. 7 is a right elevation of the solder heating device.
Figure 8:
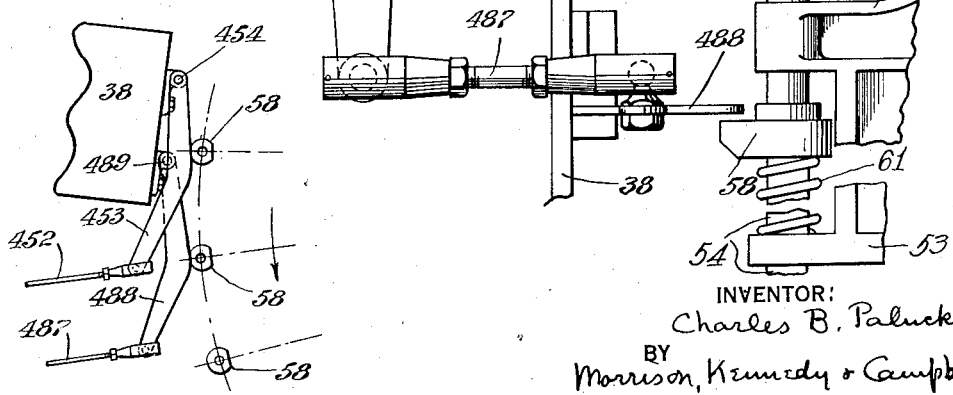
Fig. 8 is a partial diagrammatic top plan view of the control means, showing parts of three successive traveling heads and certain non-traveling mechanism controlled thereby and controlling the operativeness of the respective soldering mechanisms according to whether a lamp is present or absent.

The assembled lamps are loaded into successive heads or holders 50, that advance intermittently, and after the bulb and base have been united and the leadwires have been bent and severed the soldering of such wires to the base is to be performed. Many parts of the machine other than those pertaining to soldering are omitted herefrom, reference to be had to the prior application. Herein the general parts and traveling heads are represented by portions thereof as follows. A fixed frame bracket 38 appears in Fig. 8, to which certain levers are pivoted. The intermittently driven turret is not shown, but it carries the series of heads 50, spaced as indicated in Fig. 8. The slide bearing 53 of one of the heads is shown in Figs. 1 and 7, in which a bearing sleeve 54 moves vertically along with a plunger rod 55 carrying the cup or lower lamp holding member or socket 56. These parts 54 to 56 are pressed upwardly by spring 61 to hold the lamp at the proper elevation, as more fully described in application 722,627, the overhead socket 70 on block 72 being indicated in section as engaging the lamp base in opposition to the cup 56, and these parts 56 and 70 constituting the lamp holding chuck 50 of each head. Moving vertically with the sleeve 54 is a collar 58, which appears also in Fig. 8; this being mounted on the sleeve as more fully described in application 722,627.

The collar 58 is utilized to take part in the control of the soldering mechanism, allowing soldering to occur when the head contains a lamp as shown, but rising slightly higher, being lifted by spring 61 until stopped by bearing 53, to prevent soldering if the lamp is missing. A basing or heating ring 66 on its shank 65 is shown taking part in the cementing operation as described in application 722,627. A fixed curved table 121 constituting part of the machine frame gives support to the soldering mechanism to be described. A shaft 44, making one turn in each cycle supplies power for the automatic operation of the soldering mechanism. The reference numbers to this point correspond with numbers used in said prior application.

On top of the curved table 121 is shown in Fig. 1 a base 400 for the solder feeding mechanism. Slightly further around on the same table is a second base 401 shown in Fig. 7, this supporting the heating or flame mechanism. The top view Fig. 5 shows how the heating mechanism is offset with relation to the position of the lamp being soldered, the soldering feeding mechanism being preferably directed adjacent to the station at which the lamp is soldered.

Describing first the solder feeding mechanism, the base 400 carries on top of it a guide block 403 in which are accommodated the sliding parts for the side soldering, concealed by a cover. Above the block 403 is an inclined bracket 404, the extremity of which carries a block 405 directly above the lamp, this serving as a guideway for the vertically sliding carriage 407 of the end solder feeding mechanism; the block cover being omitted in this case. The bracket 404 is fixedly mounted in any desired manner, being shown for convenience attached upon block 403 and hence carried by the base or bracket 400.

At the foot of the vertical solder feeding carriage 407 is a guide or nozzle 408 for the vertically fed solder strip or wire G, this extending through the carriage and through the nozzle to the point of application to the lamp base disk D, Fig. 1 showing a flame being applied to melt off the extreme tip of the solder strip for the purpose. The solder feeding arrangements may be as follows. Attached in the carriage 407 is a gripper 409, in the form of a recessed and perforated plate through which the wire G is fed downwardly, the recess containing a spring pawl, for example in the form of a wedging roll 410, pressed by spring plunger 411, giving a grip action on the fed wire, so that a downward movement of the gripper correspondingly lowers the solder supply. The descent of the carriage effects this action.

In the carriage 407, above the first gripper, is a second gripper 412, this one being not fixed but slidable vertically between the side walls of the carriage, with strong spring friction members 413 tending to compel the gripper to hold its place in the carriage. The second gripper has a spring pawl 414 similar to the pawl 410, with plunger 415, see Figs. 3 and 4. The result of this double gripper arrangement is that, by relative reciprocating movements between the two grippers, the wire is compelled to move down a corresponding distance. In the absence of relative movement both grippers and wire might reciprocate vertically without any feed of solder. The feed is thus inoperative without a supplemental device, which will now be described.

Extending longitudinally upwards from the movable gripper 412 is a rod or shank 416 slidable through a fixed bearing 417 and having above the bearing a contact piece 418 in the form of a nut held in adjusted position on the rod by a lock nut 419. The rod 416 has a contact or shoulder 420 below the bearing 417, and the clearance between the shoulder 420 and the bearing plus the clearance between the bearing and the contact nut 418 may approximately equal or exceed the vertical reciprocating travel of the carriage 409, effected as will be described. As a result, and assuming that these clearances are kept open, there would normally be no relative movement between the two grippers, and no feed of the solder. In fact the rise of the carriage would cause the shoulder 420 to meet the bearing, bringing the upper gripper relatively down, until the two grippers are adjacent, and this relation would continue indefinitely, without feed.

To cause the feed mechanism to supply a predetermined length of solder strip in each cycle, it is only necessary to stop the downward movement of the upper gripper during the descent of the carriage. By whatever distance the grippers are thus separated the solder will feed to the same distance in the next stroke. This control is conveniently effected by the provision of a stop or contact 421, shown in the form of an arm, adapted to be interposed between the contact nut 418 and the bearing 417. With this stop or control member 421 thus interposed in the upper clearance, each downward movement of the carriage will cause the relative separation of the grippers, while each upward movement of the carriage, by the contact of shoulder 420 against the bearing will cause the relative descent of the top gripper, thus thrusting the desired length of solder through the bottom gripper, where it is held by that gripper in readiness for the next lowering and soldering action.

The interposing stop or control member 421 is adapted to be positioned to cause feed as described or to be moved away from position to render the feed idle, when a lamp is missing, as will be described. The member 421 may be considered as an arm, of the proper thickness, as shown, and pivoted at a distant point, removed from the observer in Fig. 1. A twisted link 422 is shown extending from the stop arm 421 to the upper end of an operating lever arm 423 fulcrumed at 424 on the bracket 404.

Substantially similar parts are arranged in the horizontal guide block 403 for supplying solder to the side of the lamp base, these parts bearing the same reference numbers with the exponent a; thus the solder nozzle 408ª is carried on the carriage 409ª. The stop arm 421ª is adapted to extend between the bearing 417ª and the contact nut 418ª. The arm 421ª is connected and operated by a twisted link 422ª from a lever arm 423ª fulcrumed at 424, and preferably being unitary with the arm 423. The front elevation Fig. 2 shows the relation of the stop arm 421ª and adjacent parts, and this indication shows also the preferred structure for the stop arm 421 and associated parts, if seen in top view. Whenever, then, the lever 423, 423ª is swung in one direction it causes feed of solder at both points, and in the other direction prevents feed of solder. The arm 423 has an adjustable stop screw 425 meeting a fixed contact 426 to determine the normal or operative position of the parts, and a spring 427 tends to shift the parts into such operative position.

Next will be described the connections for giving to the carriage 409 its down and up reciprocating motions. At its left side the carriage carries an outstanding pin 430 concealed in Fig. 1. This is engaged and operated by a swinging arm 431 slotted at its rear end, at the right side of Fig. 1. The arm is a part of a lever fulcrumed on a shaft or axle 432 to which is also connected a downwardly extending arm 433. The bell crank 431—433 thus constituted is shown actuated by a link 434 extending from the upper end of a lever-arm 435 which is fulcrumed on a shaft or axle 436. For the carriage of the side soldering device there is shown a depending arm 435$^a$ operating upon a pin or stud 430$^a$ on said carriage, so that the oscillation of lever 435—435$^a$ simultaneously works both carriages. To cause this actuation the lever has a front arm 437, the extremity of which is connected by a long depending link 438 with the front end of a cam lever 439 fulcrumed on a horizontal axle 440, the other end of the lever carrying a follower which is engaged and operated by a cam or disk 441. Without describing the exact timing of said cam, it is shown as having a long outer dwell 442 during which the carriages are held retracted, an inner dwell 443 and an intermediate dwell 444 by which the carriages are held advanced into soldering position. The cam 441 therefore operates and times the movements of each of the carriages and thereby brings about the solder feeding and applying operations, in conjunction with the operation of the control stop or arms 421 and 421$^a$.

The connections for operating the controlling stop arm 421 are as follows. Its actuating link 422 and lever 423—423$^a$ have been referred to. Depending from the lever arm 423$^a$ is a long link 447, the lower end of which is pivoted to the front arm 448 of a bell crank lever having also a depending arm 449, fulcrumed at 450 on a special bracket 451 attached beneath the curved table 121. An adjustable link 452, with universal pivots, extends from the lower end of arm 449 to the right end of a control lever or feeler 453 pivoted at 454 to the frame bracket 38. The feeler 453, as seen in Figs. 1 and 8, is arranged to cooperate with the part or collar 58 of the lamp holding head in such manner that when a lamp is present the control stop arm 421 will be operative to cause feed, and vice versa. When the lamp is present, as in Fig. 1, the collar 58 is below the lever of the feeler 453, consequently the spring 427 holds the stop arm 421 in a position to stop the contact 418 and thereby shorten the actual movement of the gripper 412, causing feed of solder as described. If a lamp be missing the collar 58 will rest at a slightly higher position, and will therefore stand in the path of the feeler 453, which will thereby be thrown so as to actuate the link 452 and the other described connections to the stop arm 421, which latter is therefore thrust rearward, that is rightward in Fig. 1, so that it will fail to affect the motion of the movable gripper 412, the two grippers therefore reciprocating idly, and feed of solder to the empty head being prevented. The same operation applies to controller stop arm 421$^a$.

Referring next to the heating or solder melting devices these are shown in Figs. 5 and 7. Upon the base 401 is mounted a tiltable carriage 457, shown in its normal or operative position and partly shown in dotted lines in its upwardly swung position wherein the heating jets will be inoperative. The carriage 457 is fulcrumed at 459 on the base. The upper part of the carriage is in the form of a rod 458 on which is a block 460 supporting a swivelled carrier 461 in which is clamped a gas pipe 462, the inner extremity of which is in the form of a nozzle or burner 463, and its outer end connected by a flexible tube 464 with a source of gas-air mixture. The nozzle 463 supplies a flame for the end soldering; such a flame being shown concentrated at the soldering point G. For the side soldering there are shown corresponding parts 460$^a$ to 464$^a$ respectively.

These elements may be tilted upwardly to lift the flames from the lamp base and render them inoperative. When in position the parts are set by means of a rear lug or extension 466 of the carriage, from which depends an adjustable stop screw 467, its lower end contacting a part of the base. A spring 468 pulls the parts into the described normal or operative position.

The flames and nozzles 463, 463$^a$ are shown in elevation and top views in Figs. 7 and 5; and in their relation to the solder nozzles in Fig. 1. By the uptilting of the heating nozzles they are held retracted during advancing travel of the heads, thus giving ample clearance for the travel. The burners are adjustable, not only by the set screw 467, but by the setting of the blocks 460, 460$^a$ on the carriage and of the carriers 461, 461$^a$ on the blocks.

Preferably the heating parts are lifted regularly in each cycle and returned to operative position, but are latched in upper or inoperative position when a lamp is missing. For this purpose the underside of the arm 466 is shown as formed with a contact surface 469, and a lifting rod 470 is shown as bearing upwardly against said surface. The lift of the rod therefore tilts back the carriage, and swings upwardly the gas nozzles. These connections may be operated as indicated in Fig. 6. A cam lever 471 has its outer end pivoted to the rod 470 and at its inner end carries a follower bearing against the periphery of a cam disk 472. This disk has an inner dwell 473 and an outer dwell 474. As the parts are shown the dwell 473 is in effect so that the rod 470 is lowered and the gas jets are in their operative position, unless they have been latched in their preceding inoperative position. Control means for rendering inoperative the heating jets is shown as comprising a latch 476 in the form of an upstanding arm fulcrumed at 477 on the base and having a forwardly extending arm 478 pivoted to the rear arm 479 of a level fulcrumed on the axle 459 and having a front arm 480 by the swinging of which the latch may be moved between its normal or inoperative position and a latching or operative position beneath a pin 481 outstanding from the rear projecting lug 466 of the carriage 458. The lever arm 480 is shown as connected by a link 482 with the front arm 483 of a bell crank lever having a depending arm 484 and fulcrumed at 485 on a bracket 486 depending from the table 121. The arm 484 is shown connected by a link 487 having universal pivots at its ends, with a feeler or lever 488, shown also in Fig. 8, this feeler, like the feeler 453, being fulcrumed at 489 on bracket 38 and arranged at such a level that it will be inoperative when the head chuck 56—70 is occupied by a lamp, but which becomes operative when the chuck is empty and the head collar 58 is relatively higher, so as to thrust the feeler lever and thus swing the latch 476 beneath the lug 466, preventing the carriage 458 and the burners from swinging into their operative position.

As seen in Figs. 7 and 8 the burner controlling feeler 488 cooperates with the traveling head coming into soldering position, allowing the burners to lower into operative position if a lamp is present; whereas the solder-feed feeler 453 cooperates at the preceding station, since the solder wire must be advanced in the carriage by the carriage advancing and retracting movements preceding the advance which brings the wire to position on the lamp base.

Thus, taking the end soldering wire G, and assuming lamps are present, each advancing descent of carriage 407 brings nozzle 408 with say ¼ inch of solder protruding, to position E where the end leadwire is curled against disk D, as the flame from burner 463 swings into position to melt the protruding solder and apply it to the leadwire. Fig. 1 shows this position. The solder strip may be of the tubular wire type, containing a flux. As the carriage next rises, both grippers 409, 412 rise until shoulder 420 strikes its stop or bearing 417, when the upper gripper stops, gripping the solder wire, the gripper 409 continuing to rise so that the solder is caused to advance relatively through the nozzle 408 and protrude for the next action; that is, the solder in the upper gripper remains stationary while the lower gripper continues to rise, causing relative advance and protrusion of solder. On the next descent of the carriage the nozzle carries the solder to soldering position, but before the end of this stroke contact 418 strikes arm 421 and stops the descent of gripper 412, so that at the end of the stroke the grippers are again apart as in Fig. 1. But if the lamp is missing in the next succeeding head the arm 421 will have retracted and the gripper 412 will have descended the whole length of the stroke, so that the next lift will cause no relative feed corresponding to the empty head.

The operation thus described for the end or top soldering applies substantially wholly to the side soldering.

The invention may be described in one aspect as comprising a mechanism for feeding a measured amount of strip solder in each cycle and applying the end thereof to soldering position and then and there melting off a portion of the solder to attach the leadwire to the base; thus affording a quite simple operation dispensing with the usual severing step, such as disclosed in said prior application. The strip feeding mechanism may be described as comprising two feed grippers in tandem, shiftable along the path of feed, with means to reciprocate them to advance and retract the solder strip, to and from applying position, along with associated means to cause relative movements between the grippers thereby feeding a short length of strip at each action. Stated otherwise the first or advanced gripper carries the solder strip while the second gripper causes the strip to feed through the first gripper. The gripper may be mounted in various ways to reciprocate cooperatively along the path of feed, but preferably the disclosed arrangement is used wherein they are both mounted on a carriage, the carriage reciprocating, and one of the grippers being yieldingly mounted on the carriage, to cause the relative feed. The carriage and first gripper reciprocate a fixed uniform distance, bringing the material to and from the work, the second gripper having a restricted play or clearance, permitting its relative movement for the described feed purposes. The relative movement between the grippers is prevented to prevent feed when a lamp is missing. The second gripper is controlled by a pair of stops or shoulders, having a total clearance normally less than the carriage reciprocation, thus causing the relative movements of the second gripper. The nut 418 is shiftable to adjust the stop clearance thereby to determine the extent of strip feed in each cycle. The removal of arm 421 increases the clearance to the full extent, thus preventing relative gripper movement and feed.

As shown the solder strip G is brought near to but does not need to come in contact with the lamp base. The flame nozzle is a means for applying heat or flame to the strip end for melting off a portion thereof to drop or move into position to attach the leadwire to the base.

The invention is shown applied to soldering the type of lamp having a single end leadwire and a side leadwire; but obviously may be used at the end only in those lamp types having no side wire, for example, those having more than one leadwire emerging and to be soldered at the end of the base.

It has thus been described in a lamp finishing machine, a mechanism for disposing properly the loose leadwires by bending and severing the same, embodying the principles and attaining the objects of the present invention. Since however many matters of combination, arrangement and construction may be variously modified without departing from the principles of the invention it is not intended to limit the invention to such matters except to the extent set forth in the appended claims.

I claim:

1. In a machine for manufacturing electric lamps of the kind composed of bulb and base portions and one or more leadwires extending from the base, the combination of a head having means to hold a lamp with the wires exposed, mechanism for feeding a measured amount of strip solder and applying the end thereof to soldering position, and means for there melting off a portion of solder to attach the leadwire to the base; said melting means comprising a flame nozzle mounted for retraction from normal position, connections for retracting and returning the nozzle in each cycle, and means for preventing return when a lamp is missing.

2. The combination as in claim 1 and wherein the machine has a series of heads traveling from station to station, and said preventing means comprising a feeler at the station where soldering is performed, and a feeler at the station in advance thereof with connections to prevent feed of solder when a lamp is missing.

3. In a machine for manufacturing electric lamps of the kind composed of bulb and base portions and one or more leadwires extending from the base, the combination of a head having means to hold a lamp with a wire exposed, and mechanism for feeding a measured amount of strip solder and applying the end thereof to soldering position, and means for there applying heat to the strip end for melting off a portion of solder to attach the leadwire to the base; said solder strip feeding mechanism comprising two feed grippers in tandem shiftable along the path of feed, means to reciprocate the grippers to advance and retract the solder strip, and associated means to cause relative movements between the grippers and thereby feed a short length of strip at each action; together with means operating to prevent the relative movements between the grippers when a lamp is missing.

4. In a machine for manufacturing electric lamps of the kind composed of bulb and base portions and one or more leadwires extending from the base, the combination of a head having means to hold a lamp with a wire exposed, and mechanism for feeding a measured amount of strip solder and applying the end thereof to soldering position, comprising a pair of cooperating grippers in tandem, means reciprocating the pair of grippers along the path of feed in each cycle to advance the strip bodily to the lamp and retract it, means operating one gripper relatively to the other in each cycle to cause the strip to feed relatively through the pair of grippers, means operating while the strip is advanced to melt off a portion of solder to attach the leadwire to the lamp base, and means operating to prevent the feeding movements of the second gripper in the absence of a lamp.

5. In an automatic machine for soldering lamp bases wherein are one or more heads for holding lamps with leadwires exposed, the combination of mechanism for feeding a measured length of strip solder and advancing the end thereof to soldering position adjacent the exposed leadwire, and means for directing a flame to the so-advanced strip end and thus melting off a predetermined portion of solder to attach the leadwire to the base; the soldering mechanism comprising a gripper carriage shiftable for advancing and retracting the strip, and two grippers thereon in tandem, means to shift the carriage for each soldering operation, and means to cause one gripper to move relatively to the other to feed a short length of strip in each operation.

6. In an automatic machine for soldering lamp bases wherein are one or more heads for holding lamps with leadwires exposed, the combination of mechanism for feeding a measured length of strip solder and advancing the end thereof to soldering position adjacent the exposed leadwire, and means for heating the so-advanced strip end and thus melting off a predetermined portion of solder to attach the leadwire to the base; the said mechanism comprising a gripper carriage and tandem grippers thereon, means to advance and retract the carriage and grippers bodily to and from the lamp base in each operation, one gripper being movable toward and from the other and having means so to move it in each operation, and means for coordinately opening and closing the grippers, thereby to feed the solder strip a short distance through the grippers in each operation.

7. In a machine for manufacturing electric lamps of the kind composed of bulb and base portions and one or more leadwires extending from the base, having means to hold a lamp with the wires exposed, the combination of mechanism for feeding a measured amount of strip solder and applying the end thereof adjacent to soldering position, comprising a pair of cooperating grippers in tandem, means reciprocating the pair of grippers bodily along the path of feed in each cycle to advance the strip bodily to the lamp and retract it, and means operating one gripper relatively to the other in each cycle to cause the strip to feed relatively through the pair of grippers, and means operating while the strip is advanced for directing a flame to melt from the strip end a portion of solder to attach the leadwire to the lamp base.

8. The combination as in claim 7 and wherein is a reciprocating carriage carrying both grippers, one gripper being yieldingly mounted on the carriage whereby it may shift relatively to the other, for relative feed, and means to open and close the grippers alternately without releasing the strip.

9. In a machine for manufacturing electric lamps of the kind composed of bulb and base portions and one or more leadwires extending from the base, having means to hold a lamp with the wires exposed, the combination of mechanism for feeding a measured amount of strip solder and applying the end thereof to soldering position, comprising a pair of cooperating grippers in tandem, means reciprocating the first gripper a fixed distance along the path of feed in each cycle to advance the strip bodily to the lamp and retract it, the second gripper being connected to reciprocate with the first but having a restricted relative play, means causing the second gripper to move through such play in each cycle to cause the strip to feed relatively through the first gripper, means coordinately to open and close the grippers, and means operating while the strip is advanced to apply heat directly to the strip and melt off a portion of solder to attach the leadwire to the lamp base.

10. In a machine for manufacturing electric lamps of the kind composed of bulb and base portions and one or more leadwires extending from the base, having means to hold a lamp with the wires exposed, the combination of mechanism for feeding a measured amount of strip solder and applying the end thereof adjacent to soldering position, comprising a carriage reciprocating along the feed path, a first gripper on the carriage, a second gripper slidable along the carriage, means to reciprocate the carriage and first gripper a uniform distance to shift the strip bodily to and from the lamp, a pair of stops for the second gripper for causing its reciprocating movements, with clearance less than the carriage reciprocation whereby the second gripper has movements relative to the first gripper thereby to feed the strip on the carriage.

11. The combination as in claim 10 and wherein is means for adjusting the stop clearance thereby to determine the strip feed.

12. The combination as in claim 10 and wherein is means to increase the stop clearance to exceed the reciprocation thereby to prevent feed of strip.

13. The combination as in claim 10 and wherein is means to increase the stop clearance to prevent feed of strip, comprising a control part or guard normally interposed in the stop path but removable to increase clearance and prevent feed.

CHARLES B. PALUCKI.